O. L. DUNKELBARGER.
SEED CORN BOX.
APPLICATION FILED SEPT. 9, 1912.
1,049,293. Patented Dec. 31, 1912.
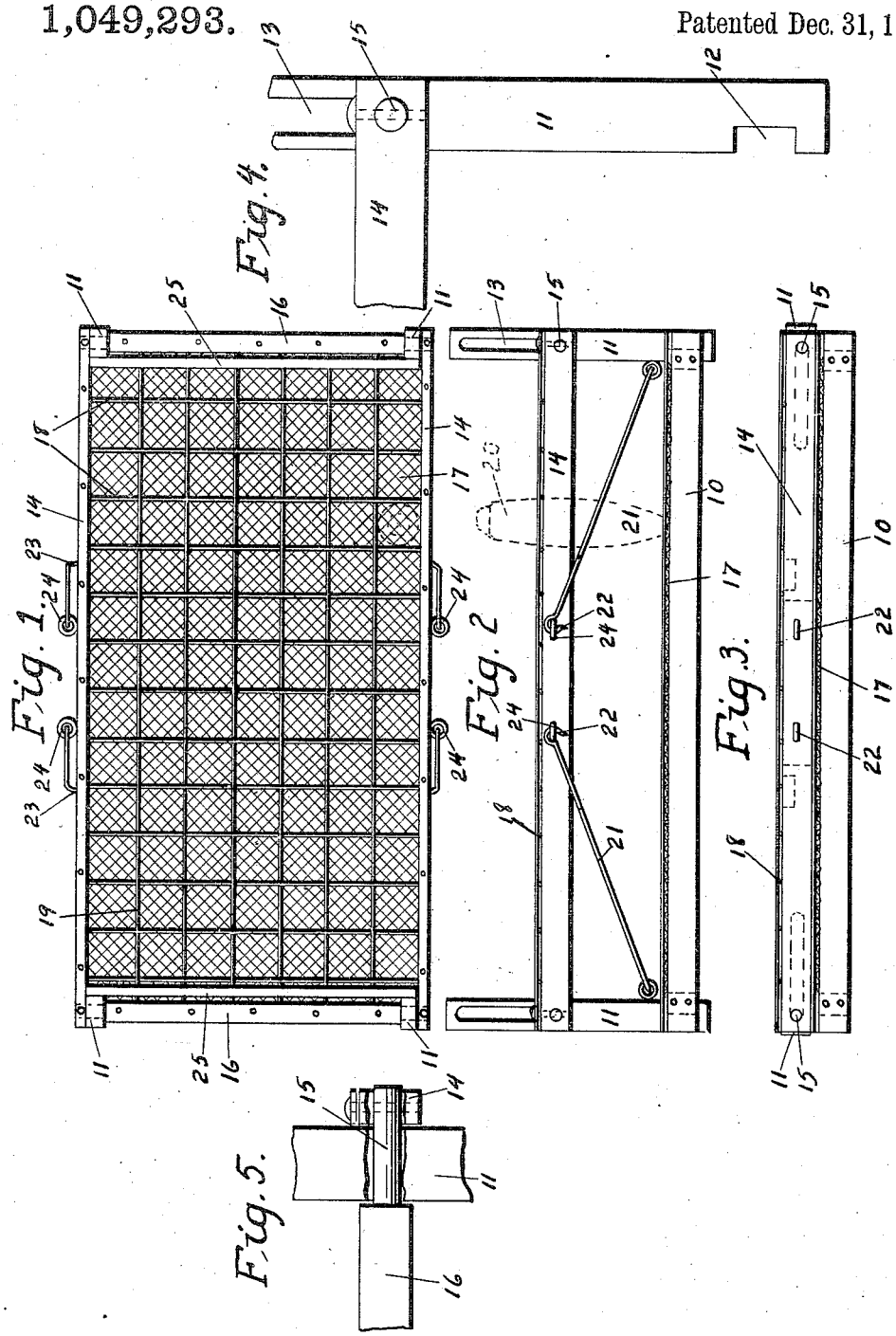

UNITED STATES PATENT OFFICE.

ORRA L. DUNKELBARGER, OF NEVADA, IOWA.

SEED-CORN BOX.

1,049,293. Specification of Letters Patent. Patented Dec. 31, 1912.

Application filed September 9, 1912. Serial No. 719,462.

*To all whom it may concern:*

Be it known that I, ORRA L. DUNKELBARGER, a citizen of the United States, residing at Nevada, in the county of Story and State of Iowa, have invented a certain new and useful Seed-Corn Box, of which the following is a specification.

The object of my invention is to provide a seed corn box of simple, durable and inexpensive construction in which ears of seed corn may be placed spaced apart from each other so that the air may have free access to all parts of the ears at all times.

A further object is to provide such a device in which the ears are held in such a manner that the seed corn box may be readily picked up and moved about without disturbing the ears.

A further object is to provide such a device so constructed and arranged that it may be readily collapsed into small space for storage or transportation.

My invention consists in certain details, in the construction, arrangement, and combination of the various parts of the device, whereby the objects contemplated are attained, as hereinafter set forth, pointed out in my claims and illustrated in the accompanying drawings, in which—

Figure 1 shows a top or plan view of my improved seed corn box. Fig. 2 shows a side elevation of the same. Fig. 3 shows a side elevation of the device in its collapsed form. Fig. 4 shows a detail view of one of the corner posts. Fig. 5 shows a detail view of the manner in which the corner posts are mounted on the upper portion of the frame, parts of the posts and horizontal side members being cut away.

In building my improved seed corn box I make a rectangular lower frame having horizontal side members which I have indicated in the accompanying drawings by the reference numeral 10. The side members 10 are connected by horizontal end members indicated by the dotted lines near each end of the members 10 in Figs. 2 and 3. The horizontal end members are set in slightly from the ends of members 10 as clearly indicated by said dotted lines. The rectangular frame just described is wholly detachable from the rest of the seed corn box and is assembled therewith or mounted thereon in the manner hereinafter described.

I provide four corner posts 11 which at their lower ends are provided with notches 12 to receive the horizontal end members of the lower rectangular frame. In the upper end of each corner post 11 is a vertical elongated slot 13 shown in Fig. 2. What I call the upper rectangular frame is mounted on the corner posts 11 in the following manner: I provide longitudinal horizontal side members 14 at each end upon a pin 15 which pin extends through the slot 13 and is received in the end of a horizontal end member 16. It will therefore be seen that the corner posts 11 are pivotably and slidably mounted at each corner between one of the side members 14 and one of the end members 16 by means of the pin 15 extending through the slot 13.

I secure to the lower rectangular frame, preferably to the upper surface thereof, a fabric 17 which may be of ordinary meshed screen wire or other suitable material which will permit the free passage of air and at the same time form a sufficiently strong support for the ends of the ears of corn. Extending between the side members 14 are a plurality of parallel wires 18 spaced apart a proper distance to receive ears of corn between them. Extending between the end members 16 I provide a plurality of parallel wires 19 spaced apart from each other a similar distance thereby forming a number of squares to receive ears of corn 20. The wires 18 and 19 are preferably intermeshed in order to support each other and to maintain the shape of the squares formed between them.

In the practical assembling and use of my improved seed corn box the lower rectangular frame is mounted on the upper rectangular frame with the end members of said lower frame received in the slots or notches 12. To prevent the upright members 11 from swinging outwardly at their lower ends and causing the frame to collapse when not in use, I have pivotably mounted on the opposite faces of two of the posts 11 at one side of the device, arms 21 on the ends of which are hooks 22, the arms 21 when in position are inclined upwardly and toward each other and are also bent outwardly at 23 as shown in Fig. 1 to clear the side member 14. In one of the side members 14 I have secured eyelets 24 to receive the hook member 22.

When the seed corn box is assembled and ready for use the ears are inserted downwardly in the squares until their lower ends rest upon the perforated fabric 17. The seed corn box may be made of sufficient capacity to hold any number of ears, and the size of the squares between the wires may be slightly varied to fit different varieties of corn. For bracing the corner posts 11 and also to serve as handles for lifting the seed corn box I secure between the corner posts at each end of the device, cross members 25.

It will be seen that the boxes may be placed one above the other and stacked as high as desired when filled with corn and the corn in the boxes will not be in any way interfered with. The boxes may be lifted and moved from place to place by means of the cross pieces 25 and the ears will not be disturbed. When the ears of corn are removed, the seed corn box may be collapsed by unfastening the arms 21. The lower ends of the corner posts 11 may then be moved outwardly until they are released from engagement with the end members of the lower rectangular frame. The upper frame may then be lifted away from the lower frame and the lower ends of the posts 11 may be swung inwardly toward the center of the upper rectangular frame. The posts may be slid longitudinally and will lie parallel with the frame members 14. The upper frame may then be laid flat upon the lower frame as shown in Fig. 3 of the drawings, and the whole device may be packed away in a small space.

Among the many advantages of my improved seed corn box are the facts that it holds the ears spaced apart from each other and subject to free passage of air. The ears are supported in upright position and the box may be moved about freely without disturbing the ears or dropping them out of the seed corn box. In most seed corn racks the ears are supported horizontally and if the racks are slightly tipped the ears are dropped out. In such racks in order to prevent the ears from dropping out, it is necessary to provide side walls of meshed or other material to hold the ears in position. In my device I am able to dispense with these side walls entirely.

My improved rack may be easily taken apart and collapsed for storage or transportation, occupying a very small space when in its collapsed position. The device is so constructed and arranged that it may be made of cheap material which is readily accessible and the seed corn box when completed will practically never wear out.

A considerable number of variations may be made in the details of the construction of my device without departing from the especial features of my device as defined in the appended claims.

It will be readily seen that my device can be used in rigid form and will retain most of the advantages hereinbefore set forth. Whether the collapsed or rigid form be used, the boxes can be stacked one above the other and on account of features of construction above described, will permit free circulation of air through all the seed corn boxes.

I claim as my invention.

1. In a device of the class described, a lower rectangular frame, upright corner posts mounted thereon, an upper rectangular frame mounted on said posts, a fabric on said lower frame, parallel longitudinal wires on said upper frame and parallel transverse wires on said upper frame, said wires being arranged to form squares for the reception of ears of corn resting in upright position on said fabric.

2. In a device of the class described, a lower rectangular frame comprising horizontal side members and horizontal end members, corner posts detachably mounted on said lower frame and an upper rectangular frame slidably and pivotally mounted on said corner posts.

3. In a device of the class described, a lower rectangular frame comprising horizontal side members and horizontal end members, a fabric mounted on said lower rectangular frame, corner posts detachably mounted on said lower frame, an upper rectangular frame slidably and pivotally mounted on said corner posts, parallel longitudinal wires mounted on said upper frame and parallel transverse wires mounted thereon, said wires forming squares designed to receive ears of corn.

4. In a device of the class described, a lower rectangular frame comprising horizontal side members and horizontal end members, corner posts provided with notches to receive said end members, an upper rectangular frame pivotally and slidably mounted on said corner posts, arms pivotally mounted on the opposite faces of two of said corner posts at one side of said device, said arms being bent outwardly to clear the side members of said upper rectangular frame, and means for detachably securing the upper ends of said arms to the outer surface of one of the side members of said upper frame.

5. In a device of the class described, a lower rectangular frame comprising horizontal side members and horizontal end members connecting said side members, a fabric of material mounted on said frame, corner posts each of which is provided with a notch to receive one of the end members of said lower rectangular frame, each of said corner posts being also provided in its upper portion with an elongated vertical slot extending through it, an upper rectangular frame comprising horizontal side members and horizontal end members, a plurality of pins each of which extends through the slot in one of said corner posts and is secured to one of the side members and one of the end members of said upper rectangular frame whereby said upper frame is pivotally and slidably mounted upon each of said corner posts.

6. In a device of the class described, a rectangular lower frame comprising horizontal side members and angular horizontal end members connecting said side members, said end members being spaced slightly inwardly from the ends of said side members, four corner posts each of which is provided at its lower end with an angular notch designed to receive one of said end members and is provided at its upper end with an elongated vertical slot extending through it, and an upper rectangular frame comprising horizontal side members and horizontal end members, pins connecting said side members and said end members and extending through said slots whereby said upper frame is slidably mounted on said corner posts and means for detachably securing said corner posts against outward movement when said device is assembled.

7. In a device of the class described, a rectangular lower frame comprising horizontal side members and angular horizontal end members connecting said side members, said end members being spaced slightly inwardly from the ends of said side members, four corner posts each of which is provided at its lower end with an angular notch designed to receive one of said end members and is provided at its upper end with an elongated vertical slot extending through it, and an upper rectangular frame comprising horizontal side members and horizontal end members, pins connecting said side members and said end members and extending through said slots whereby said upper frame is slidably mounted on said corner posts and means for detachably securing said corner posts against outward movement when said device is assembled, and cross braces designed to serve also as handles connecting the upper ends of the corner posts at each end of the device.

Des Moines, Iowa, Aug. 30, 1912.

ORRA L. DUNKELBARGER.

Witnesses:
L. COOK,
S. ROBINSON.

---

Copies of this patent may be obtained for five cents each, by addressing the "Commissioner of Patents, Washington, D. C."